(12) United States Patent
Son et al.

(10) Patent No.: US 12,170,457 B2
(45) Date of Patent: Dec. 17, 2024

(54) DEVICE FOR CONTROLLING LINE CONNECTION TYPE FUEL CELL SYSTEM AND METHOD FOR THE SAME

(71) Applicants: Hyundai Motor Company, Seoul (KR); Kia Corporation, Seoul (KR)

(72) Inventors: Yong Doo Son, Incheon (KR); Jung Tak Kang, Incheon (KR); Won Jung Kim, Seoul (KR); Jun Seok Seo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 49 days.

(21) Appl. No.: 17/892,063

(22) Filed: Aug. 20, 2022

(65) Prior Publication Data
US 2023/0133428 A1    May 4, 2023

(30) Foreign Application Priority Data
Nov. 2, 2021 (KR) .......... 10-2021-0149257

(51) Int. Cl.
| | |
|---|---|
| *H02J 9/00* | (2006.01) |
| *H01M 8/04537* | (2016.01) |
| *H01M 8/04858* | (2016.01) |
| *H02J 7/00* | (2006.01) |
| *H02J 9/06* | (2006.01) |
| *H01M 16/00* | (2006.01) |

(52) U.S. Cl.
CPC ......... *H02J 9/062* (2013.01); *H01M 8/04619* (2013.01); *H01M 8/0488* (2013.01); *H01M 8/0491* (2013.01); *H02J 7/0063* (2013.01); *H01M 16/006* (2013.01); *H01M 2220/20* (2013.01); *H01M 2250/20* (2013.01)

(58) Field of Classification Search
CPC ...................................................... H02J 9/062
See application file for complete search history.

(56) References Cited

U.S. PATENT DOCUMENTS

| | | | |
|---|---|---|---|
| 8,445,150 B2 | 5/2013 | Ballantine | |
| 2002/0109410 A1* | 8/2002 | Young | H02J 9/062 307/64 |
| 2018/0342876 A1* | 11/2018 | Agnew | H02J 3/007 |
| 2021/0347459 A1* | 11/2021 | Lipponen | H02J 4/00 |
| 2023/0033624 A1 | 2/2023 | Son et al. | |

FOREIGN PATENT DOCUMENTS

| | | |
|---|---|---|
| KR | 10-1047022 B1 | 7/2011 |
| KR | 10-2021-0065602 A | 6/2021 |
| KR | 10-2023-0019639 A | 2/2023 |

\* cited by examiner

*Primary Examiner* — Adi Amrany
(74) *Attorney, Agent, or Firm* — Fox Rothschild LLP (57) ABSTRACT

A device for controlling a line connection type fuel cell system and a method for the same are provided. The device for controlling a line connection type fuel cell system includes a plurality of fuel cell modules, an Alternating Current (AC) voltage generator, and a controller to activate the AC voltage generator to generate an AC voltage corresponding to power supplied from a system, and to control the plurality of fuel cell modules to generate a current in synchronization with the AC voltage.

13 Claims, 7 Drawing Sheets

DEVICE FOR CONTROLLING LINE CONNECTION TYPE FUEL CELL SYSTEM AND METHOD FOR THE SAME

CROSS-REFERENCE TO RELATED APPLICATION(S)

This application claims, under 35 U.S.C. § 119(a), the benefit of Korean Patent Application No. 10-2021-0149257, filed in the Korean Intellectual Property Office on Nov. 2, 2021, the disclosure of which is herein incorporated by reference.

BACKGROUND

Technical Field

Embodiments of the present disclosure relate to systems and methods of controlling the operation of a line connection type fuel cell system when power failure occurs in a system.

Description of the Related Art

A fuel cell is a power generation system which directly converts the chemical reaction energy of hydrogen, which is contained in a hydrocarbon-based material such as hydrogen, methanol, and ethanol, and an oxidizing agent, into electrical energy.

A Solid Oxide Fuel Cell (SOFC), often referred to as a third-generation fuel cell, is a fuel cell which includes both an electrolyte and an electrode (which are basic elements constituting a cell), includes ceramic (nickel and zirconia), and has a higher power generation efficiency resulting from a higher operating temperature (in the range of 500° C. to 1000° C.). In addition, the SOFC may employ the heat of exhaust gas.

The SOFC may employ various fuels, such as carbon monoxide, methane, gasoline, and diesel, as well as hydrogen. In addition, since the SOFC employs a non-precious metal electrode, a power generation system using the SOFC is expected to replace existing power plants and existing district heating systems.

A line connection type fuel cell system is a kind of a power generator which supplies a current in synchronization with a voltage and a frequency received from a system (hereinafter, a power system) of a power company. When the power supplied from the system is cut off, that is, when the power failure occurs in the system, the power is no longer generated.

SUMMARY

An exemplary embodiment of the present disclosure provides a device configured to control a line connection type fuel cell system and a method for the same, configured to generate an Alternating Current (AC) voltage (a voltage and a frequency) corresponding to power supplied from a power system, and configured to generate a current in synchronization with the AC voltage, when the power supplied from the power system is cut off (e.g., a power failure), under a situation in which self-generated power is supplied to a load, together with the power supplied from the power system, thereby immediately enabling normal operation of the line connection type fuel cell system, even if the power supplied from the power system is cut off (e.g., failed).

The technical problems to be solved by the present disclosure are not limited to the aforementioned problems, and any other technical problems not mentioned herein will be clearly understood from the following description by those skilled in the art to which the present disclosure pertains. In addition, it can be easily understood that the objects and the features of the present disclosure are implemented by means and the combination of the means claimed in appended claims.

According to an exemplary embodiment of the present disclosure, a device for controlling a line connection type fuel cell system is provided. The device may include a plurality of fuel cell modules, an AC voltage generator, and a controller configured to activate the AC voltage generator to generate an AC voltage corresponding to power supplied from a system, and configured to control the plurality of fuel cell modules to generate a current in synchronization with the AC voltage.

According to an exemplary embodiment of the present disclosure, the AC voltage may have a voltage and a frequency corresponding to the power supplied from the system.

According to an exemplary embodiment of the present disclosure, the AC voltage generator may include an energy source, and a DC/AC converter to convert a Direct Current (DC) voltage output from the energy source into the AC voltage having the voltage and the frequency corresponding to the power supplied from the system.

According to an exemplary embodiment of the present disclosure, the energy source may include any one of a fuel cell, a battery, and an Energy Storage System (ESS).

According to an exemplary embodiment of the present disclosure, the controller may be configured to monitor the status in which power is supplied from the system or the status in which the power from the power system is cut off.

According to an exemplary embodiment of the present disclosure, the device may further include an Automatic Transfer Switch (ATS) configured to disconnect the system from the plurality of fuel cell modules, when the power supplied from the system is cut off, and to connect the system to the plurality of fuel cell modules, when the supply of the power from the system is resumed.

According to an exemplary embodiment of the present disclosure, a method for controlling a line connection type fuel cell system is provided. The method may include monitoring, by a controller, a system, generating, by an AC voltage generator, an AC voltage corresponding to power supplied from the system, when the power supplied from the system is cut off, and generating, by a plurality of fuel cell modules, a current in synchronization with the AC voltage.

According to an exemplary embodiment of the present disclosure, the method may include converting a DC voltage output from an energy source into an AC voltage having a voltage and a frequency corresponding to the power supplied from the system.

According to an exemplary embodiment of the present disclosure, the method may include monitoring a status in which power is supplied from the system, and monitoring a status in which the power supplied from the system is cut off.

According to another exemplary embodiment of the present disclosure, a device for controlling a line connection type fuel cell system is provided. The device may include a plurality of fuel cell modules and a controller configured to control any one of the plurality of fuel cell modules to generate an AC voltage corresponding to power supplied from the system, and configured to control remaining fuel cell modules to generate a current in synchronization with the AC voltage.

According to another exemplary embodiment of the present disclosure, the AC voltage may have a voltage and a frequency corresponding to the power supplied from the system.

According to another exemplary embodiment of the present disclosure, the controller may be configured to monitor the status in which power is supplied from the system or the status in which the power from the power system is cut off.

According to another exemplary embodiment of the present disclosure, the device may further include an Automatic Transfer Switch (ATS) configured to disconnect the system from the plurality of fuel cell modules, when the power supplied from the system is cut off, and to connect the system to the plurality of fuel cell modules, when the supply of the power from the system is resumed.

Other aspects are disclosed infra.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and (b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
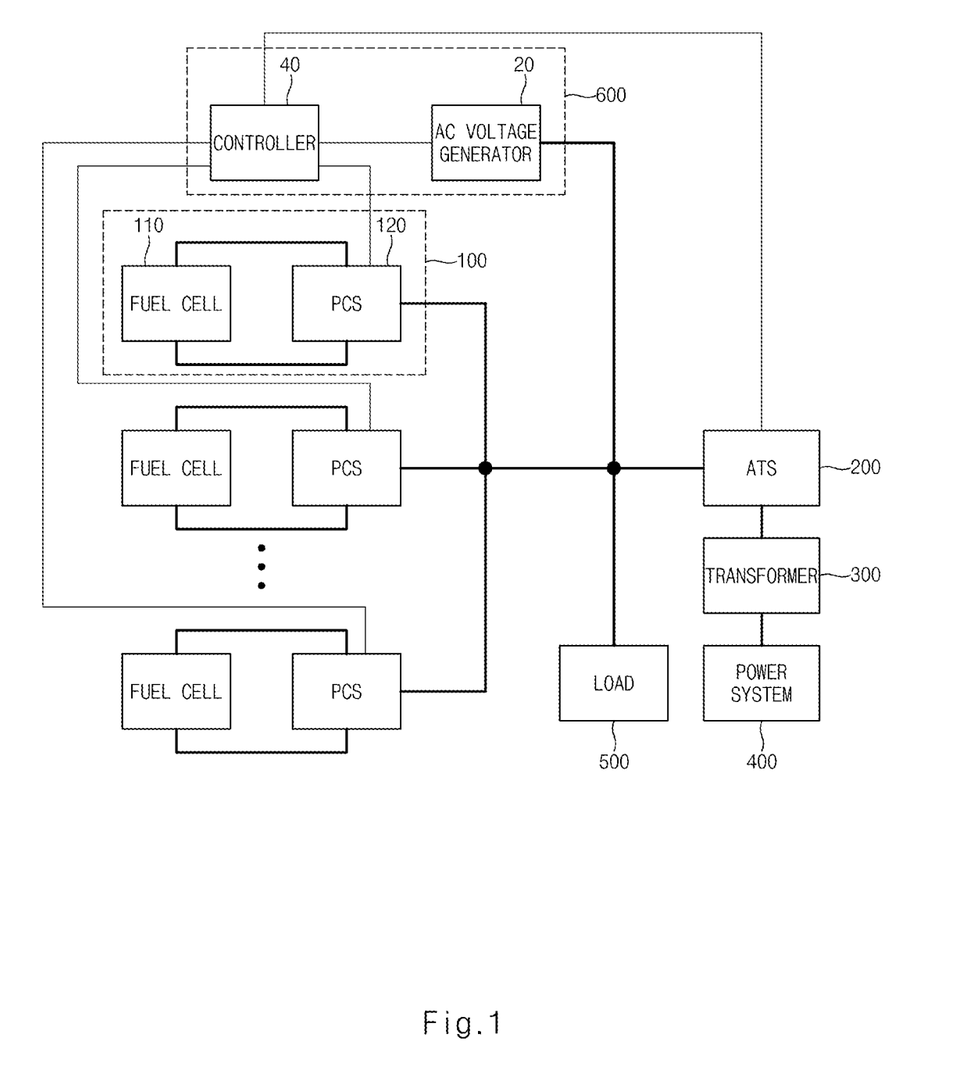
FIG. 1 is a view illustrating a line connection type fuel cell system, according to the present disclosure.

FIG. 1 is a view illustrating a line connection type fuel cell system, according to the present disclosure.

As illustrated in FIG. 1, a line connection type fuel cell system according to the present disclosure may include a plurality of fuel cell modules 100, an Automatic Transfer Switch (ATS) 200, a transformer 300, a power system 400, a load 500, and a control device 600.

The fuel cell module 100, which is a module configured to generate electric power under the control of the controller 40, may include a fuel cell 110 and a Power Conditioning System (PCS) 120. The PCS 120 may convert a direct current, which is generated from the fuel cell 110, into an Alternating Current (AC), and may variously change the AC by adjusting a switching speed.

The ATS 200 may disconnect the power system 400 from the fuel cell module 100, when cutting off power supplied from the power system 400, and may connect the power system 400 to the fuel cell module 100, when the supply of the power from the power system 400 is resumed.

The transformer 300 may transform a higher voltage (e.g., 22.9 kV) supplied from the power system 400 into a lower voltage (e.g., 380 V or 440 V), or may transfer a lower voltage to the higher voltage.

The power system 400, which is referred to as a power supply network for each area, may include a supply network of power supplied from a super-large generator (e.g., a hydroelectric generator, a thermal generator, a nuclear generator, etc.).

The load 500, which is a subject to consume power, may include all types of electronic devices.

The control device 600 may control the overall operation of the line connection type fuel cell system, and may operate the line connection type fuel cell system in a load mode or in a power system mode. According to various embodiments, the load mode refers to a mode to supply self-generated power to the load 500, and the power system mode refers to a mode to supply the self-generated power to the power system 400 together with the power supplied from the power system 400. In particular, the control device 600 may be configured to activate the AC voltage generator 20 to generate an AC voltage (voltage and frequency) corresponding to power supplied from the power system 400, and may control the plurality of fuel cell modules 100 to generate a current, in synchronization with the AC voltage generated from the AC voltage generator 20, when the power supplied from the power system 400 is cut off (power failure), under the situation that the self-generated power is supplied to the load 500 together with the power supplied from the power system 400, The control device 600 may be configured to individually control the plurality of fuel cell modules 100. In addition, a fuse or a circuit breaker may be provided on a power line between the plurality of fuel cell modules 100 and the ATS 200, to prevent an electric impact, which is caused by the cut off of power from the power system 400, from being applied to the plurality of fuel cell modules 100.

Hereinafter, the configuration of the control device 600 will be described in detail with reference to FIG. 2.

Figure 2:
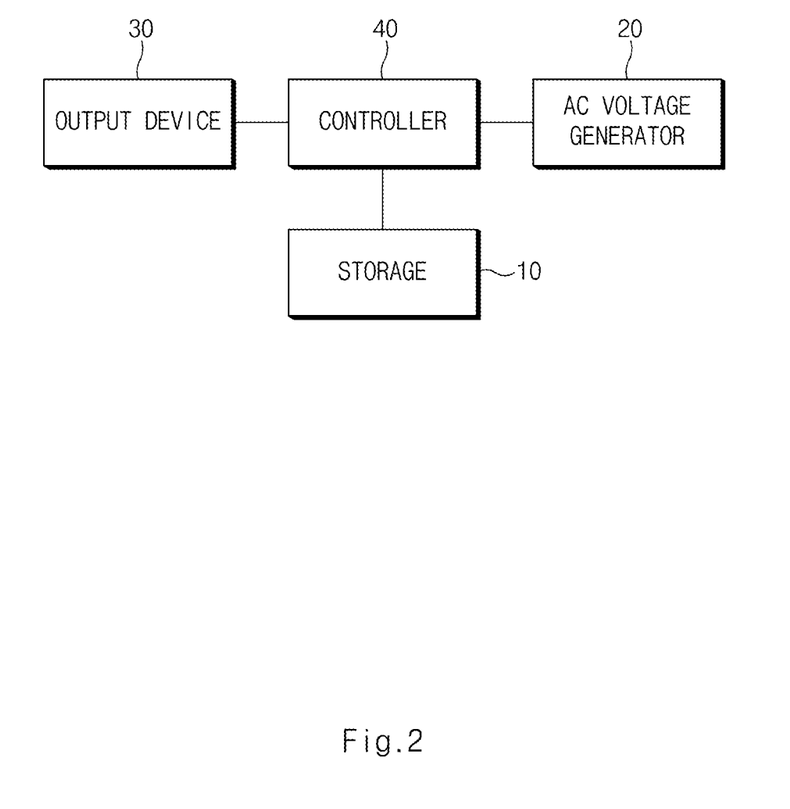
FIG. 2 is a block diagram illustrating the configuration of a device configured to control a line connection type fuel cell system, according to an embodiment of the present disclosure.

FIG. 2 is a block diagram illustrating the configuration of a device (control device) for controlling a line connection type fuel cell system, according to an exemplary embodiment of the present disclosure.

As illustrated in FIG. 2, according to an exemplary embodiment of the present disclosure, the control device 600 in the line connection type fuel cell system may include a storage 10, an AC voltage generator 20, an output device 30, and a controller 40. According to an exemplary embodiment of the present disclosure, the components may be combined into each other to be implemented in one form, or some components may be omitted, depending on the manners of reproducing the control device 600 of the line connection type fuel cell system.

In particular, regarding the components, the storage 10 may be configured to store various logic, various algorithms, and various programs required in a process of activating the AC voltage generator 20 to generate the AC voltage (a voltage and a frequency) corresponding to power supplied from the power system 400, and of controlling the plurality of fuel cell modules 100 to generate a current in synchronization with the AC voltage generated from the AC voltage generator 20, when the power supplied from the power system 400 is cut off (power failure), under the situation that the self-generated power is supplied to the load 500 together with the power supplied from the power system 400.

The storage 10 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The AC voltage generator 20 may be configured to generate an AC voltage having a voltage (e.g., 22.9 kV) and a frequency (e.g., 60 Hz) corresponding to power supplied from the power system 400. According to an exemplary embodiments, the AC voltage generator 20 does not require a large amount of energy because the AC voltage generator 20 does not generate a current corresponding to power supplied form the power system 400, and may be implemented in small size. Therefore, the AC voltage generator 20 may include at least one of various energy sources, such as a fuel cell, a battery, and an Energy Storage System (ESS). For example, the AC voltage generator 20 may include a fuel cell serving as an energy source, as illustrated in FIG. 3.

Figure 3:
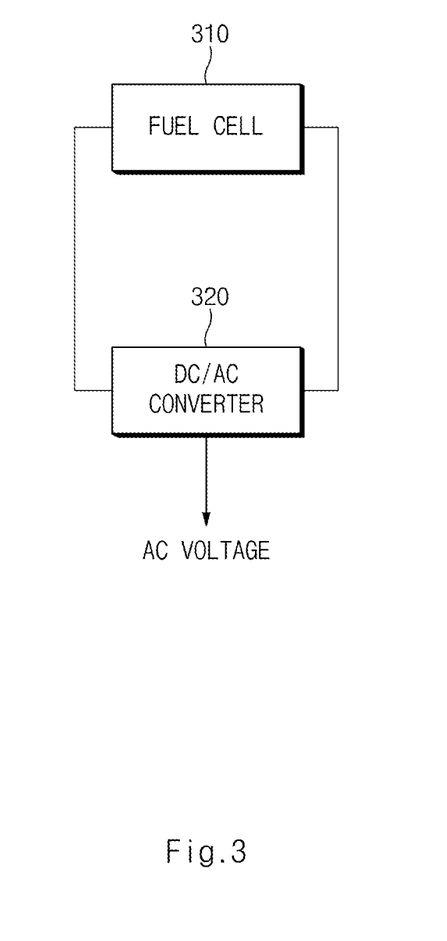
FIG. 3 is a block diagram illustrating the configuration of an Alternating Current (AC) voltage generator provided in a device configured to control a line connection type fuel cell system, according to an embodiment of the present disclosure.

FIG. 3 is a block diagram illustrating the configuration of an AC voltage generator provided in a control device of a line connection type fuel cell system, according to an exemplary embodiment of the present disclosure.

As illustrated in FIG. 3, according to an exemplary embodiment of the present disclosure, the AC voltage generator 20 provided in the control device 600 of the line connection type fuel cell system may include a fuel cell 310 and a DC/AC converter 320.

According to an exemplary embodiment, the DC/AC converter 320 may convert a Direct Current (DC) voltage, which is output from the fuel cell 310, into an AC voltage having a voltage and frequency corresponding to the power supplied from the power system 400, under the control of the controller 40.

The output device 30 may be configured to output status information of the ATS 200, as a monitoring result of the controller 40. For example, the output device 30 may be configured to output a status in which power is supplied from the power system 400, or a status in which the power from the power system 400 is cut off.

The controller 40 may be configured to perform the overall control operation, such that the components normally perform the respective functions. In addition, the controller 40 may be implemented in the form of hardware or software, and may be implemented in the form of the combination of the hardware and the software. Preferably, the controller 40 may be implemented with a micro-processor, but the present disclosure is not limited thereto.

In particular, the controller 40 may be configured to activate the AC voltage generator 20 to generate an AC voltage (voltage and frequency) corresponding to power supplied from the power system 400, and may be configured to control the plurality of fuel cell modules 100 to generate a current in synchronization with the AC voltage generated from the AC voltage generator 20, when the power supplied from the power system 400 is cut off (power failure), under the situation that the self-generated power is supplied to the load 500 together with the power supplied from the power system 400.

For example, the controller 40 may be configured to monitor, through the ATS 200, a status in which power is supplied from the power system 400 or a status in which the power from the power system 400 is cut off.

For example, the controller 40 may be configured to monitor the status in which power is supplied from the power system 400 or the status in which the power from the power system 400 is cut off, by providing an additional sensor (not illustrated). According to an exemplary embodiment, the sensor may include a voltage sensor configured to sense a voltage corresponding to the power and a frequency sensor configured to sense a frequency corresponding to the power.

Meanwhile, the following description will be made regarding the procedure in which the controller 40 constructs a closed-loop power network by operating together with the ATS 200.

First, when the power supplied from the power system 400 is cut off, the ATS 200 electrically disconnects the power system 400 from the fuel cell module 100.

In this case, the controller 40, which monitors the operation of the ATS 200, may sense the cut off of power from the power system 400, and may construct a closed-loop power network. In other words, to construct the closed-loop power network, the controller 40 may activate the AC voltage generator 20 to generate the same as an AC voltage (a voltage and a frequency) corresponding to the power supplied from the power system 400, and may control the plurality of cell modules 100 to generate a current in synchronization with the AC voltage generated from the AC voltage generator 20.

According to an exemplary embodiment, even if the power from the power system 400 is cut off, the fuel cell module 100 may self-generate power and may supply the power to the load 500.

Figure 4:
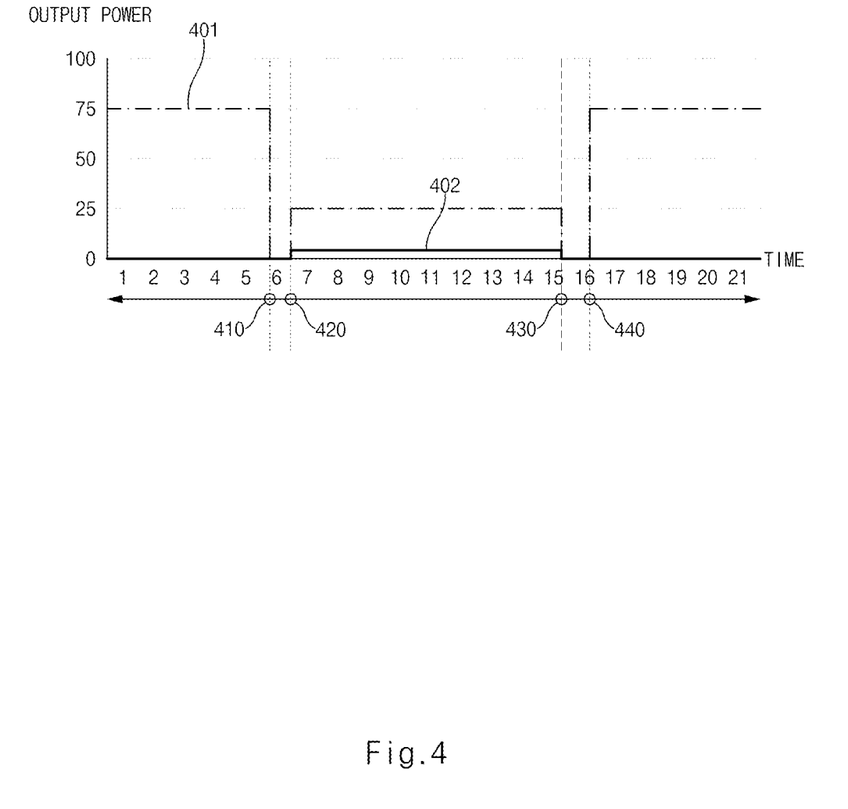
FIG. 4 is a view illustrating a status transition of a line connection type fuel cell system, according to an embodiment of the present disclosure.

FIG. 4 is a view illustrating a status transition of a line connection type fuel cell system, according to an exemplary embodiment of the present disclosure.

In FIG. 4, reference numeral '401' indicates power supplied to the load 500, and reference numeral '402' indicates the operating status of the AC voltage generator 20. According to an exemplary embodiment, the power 401 supplied to the load 500 is the sum of power supplied from the power system 400 and the self-generated power.

As illustrated in FIG. 4, when the power system 400 fails while the self-generated power is being supplied to the load 500, together with the power supplied from the power system 400 (reference numeral 410), the power supplied from the power system 400 is cut off and, thus, the self-power generation is stopped, such that the power 401 supplied to the load 500 is completely cut off.

Thereafter, when the AC voltage generator 20 is activated by the controller 40 (reference numeral 420), self-power generation becomes possible, such that the self-generated power is supplied to the load 500. According to an exemplary embodiment, the power supplied to the load 500 is lower than power which is supplied to the load 500 before the power failure because the current status is in the status of the power failure.

Thereafter, when the power failure occurring in the power system 400 is overcome (reference numeral 430), the controller 40 deactivates the AC voltage generator 20 and temporarily stops the self-power generation.

Thereafter, the line connection type fuel cell system enters into a normal status to supply the self-generated power to the load 500, together with the power supplied from the power system 400.

Figure 5:
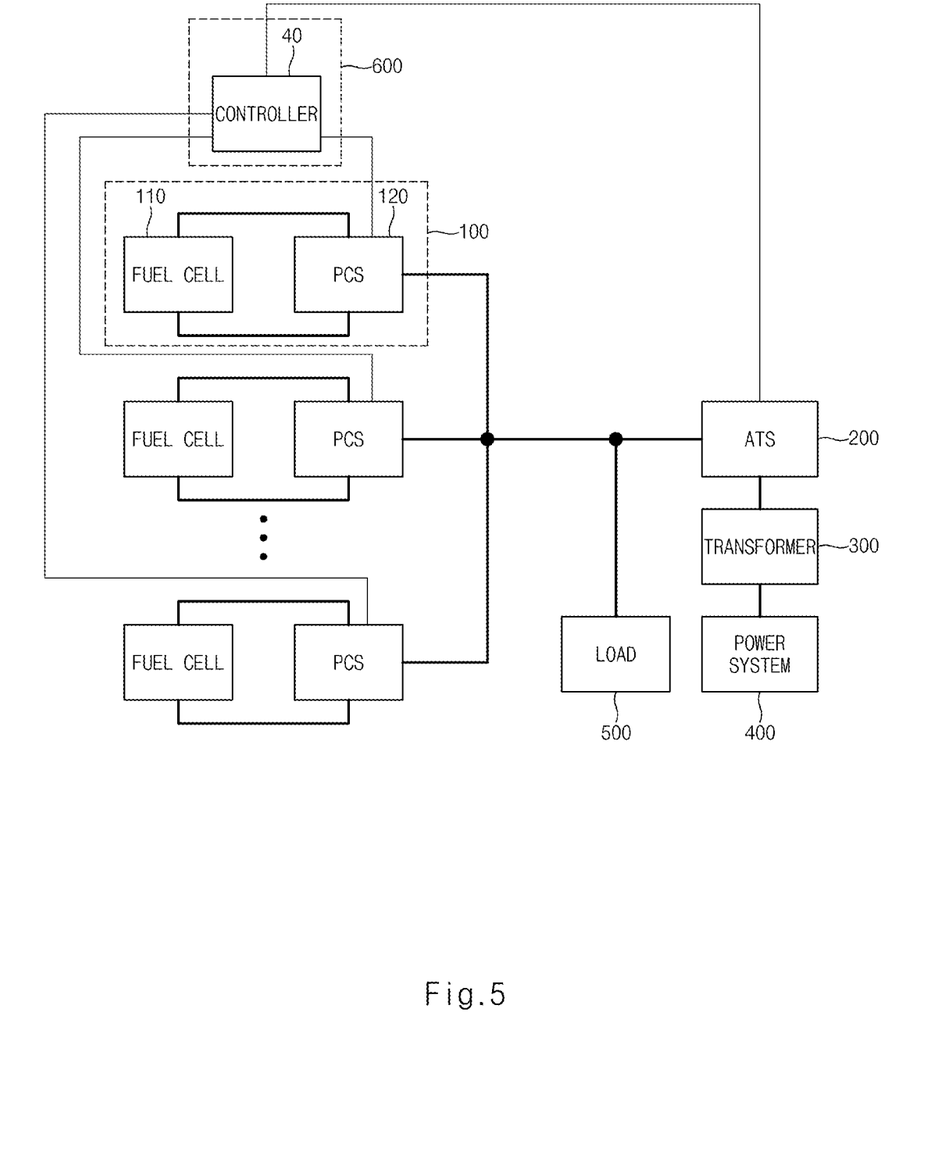
FIG. 5 is a block diagram illustrating the configuration of a device configured to control a line connection type fuel cell system, according to another embodiment of the present disclosure.

FIG. 5 is a block diagram illustrating the configuration of a control device of a line connection type fuel cell system, according to another exemplary embodiment of the present disclosure.

As illustrated in FIG. 5, according to another exemplary embodiment of the present disclosure, the control device 600 of the line connection type fuel cell system has no AC voltage generator 20.

Accordingly, the controller 40 may be configured to control any one of the plurality of fuel cell modules 100 to generate an AC voltage (a voltage and a frequency) corresponding to power supplied from the power system 400, and configured to control remaining fuel cell modules 100 to generate a current in synchronization with the AC voltage when the power supplied from the power system 400 is cut off (power failure), under the situation that the self-generated power is supplied to the load 500 together with the power supplied from the power system 400.

Figure 6:
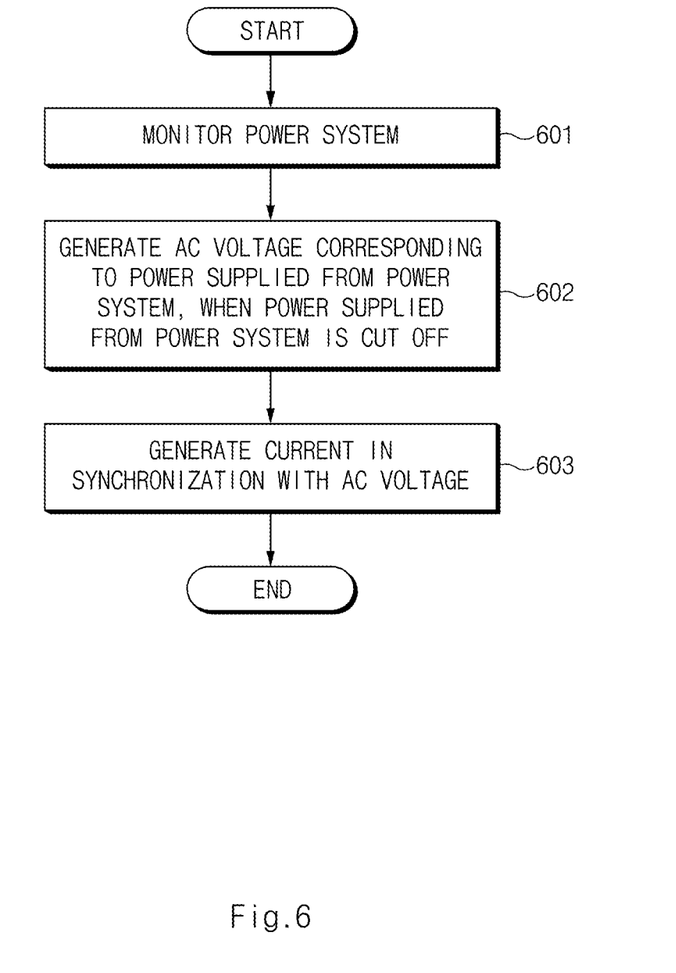
FIG. 6 is a flowchart illustrating a method for controlling a line connection type fuel cell system, according to an embodiment of the present disclosure.

FIG. 6 is a flowchart illustrating a method for controlling a line connection type fuel cell system, according to an exemplary embodiment of the present disclosure.

First, the controller 40 monitors the power system 400 (601). Thereafter, the AC voltage generator 20 generates the AC voltage (voltage and frequency) corresponding to power supplied from the power system 400, under the control of the controller 40, when the power supplied from the power system 400 is cut off (602).

Thereafter, the plurality of fuel cell modules 100 generate a current, in synchronization with the AC voltage under the control of the controller (603).

Figure 7:
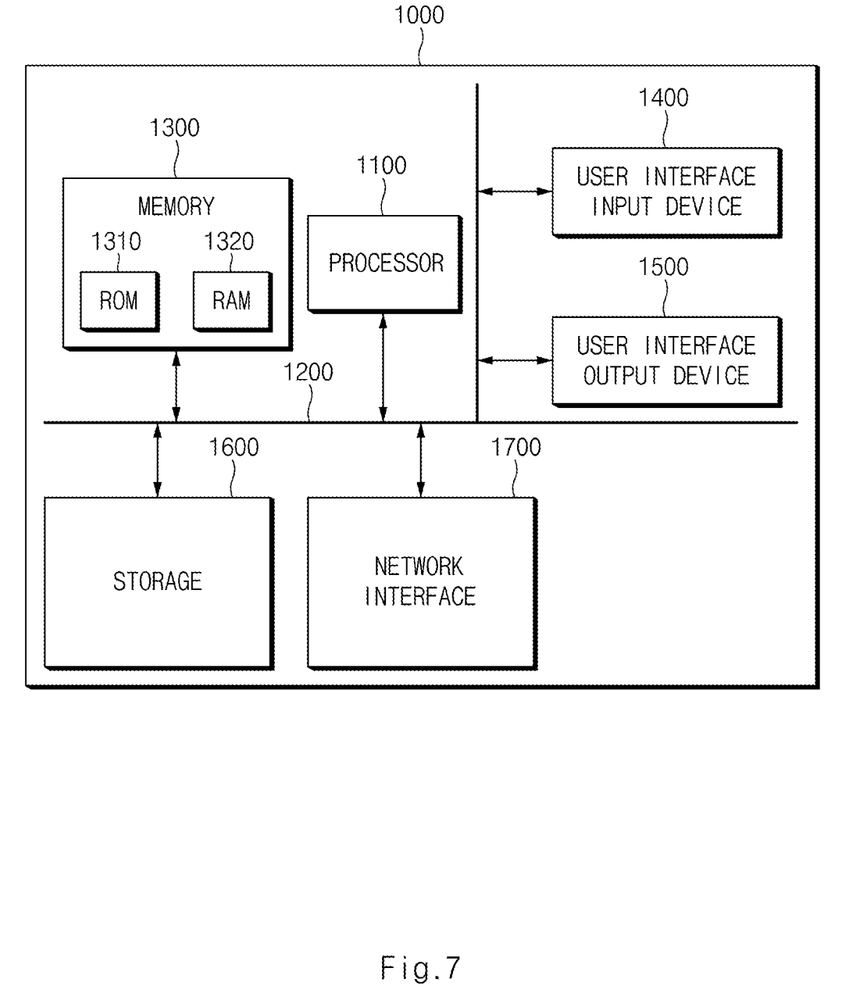
FIG. 7 is a block diagram illustrating a computing system configured to execute a method for controlling a line connection type fuel cell system, according to an embodiment of the present disclosure.

FIG. 7 is a block diagram illustrating a computing system to execute a method for controlling a line connection type fuel cell system, according to an exemplary embodiment of the present disclosure.

Referring to FIG. 7, according to an exemplary embodiment of the present disclosure, the method for controlling the line connection type fuel cell system may be implemented through the computing system. A computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM memory, a flash memory, a ROM, memory an erasable and programmable ROM (EPROM), an electrically EPROM (EEPROM), a register, a hard disc, a solid state drive (SSD), a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to an embodiment of the present disclosure, in the device for controlling the line connection type fuel cell system and the method for the same, the AC voltage (voltage and frequency) corresponding to power supplied from the power system may be generated, and the current may be generated in synchronization with the AC voltage, when the power supplied from the power system is cut off (black out), under the situation that self-generated power is supplied to the load, together with the power supplied from the power system, thereby immediately normally operating the line connection type fuel cell system, even if the power supplied from the power system is cut off (failed).

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be construed by the attached claims, and all equivalents thereof should be construed as being included within the scope of the present disclosure.

What is claimed is:

1. A device for controlling a line connection type fuel cell system, the device comprising:
   a plurality of fuel cell modules in electrical communication with a load and configured to self-generate power; and
   a control device including:
     an Alternating Current (AC) voltage generator in electrical communication with the load; and
     a controller in communication with the plurality of fuel cell modules and the AC voltage generator, wherein the controller configured to:
       operate the line connection type fuel cell system in a power system mode in which self-generated power from the plurality of fuel cell modules and power from an external power system are each supplied to the load; and
       when operating the line connection type fuel cell system in the power system mode and the power supplied from the external power system is cut off:
         activate the AC voltage generator to generate an AC voltage corresponding to the power supplied from the external power system; and
         control the plurality of fuel cell modules to generate a current in synchronization with the AC voltage;
       wherein the AC voltage generator does not generate a current corresponding to the power supplied from the external power system.

2. The device of claim 1, wherein the AC voltage generator comprises:
   an energy source; and
   a Direct Current (DC)/AC converter configured to convert a DC voltage output from the energy source into the AC voltage having a voltage and a frequency corresponding to the power supplied from the external power system.

3. The device of claim 2, wherein the energy source comprises one of a fuel cell, a battery, and an Energy Storage System (ESS).

4. The device of claim 1, wherein the controller is configured to monitor:
   a status in which power is supplied from the external power system; or
   a status in which the power that is supplied from the external power system is cut off.

5. The device of claim 1, further comprising an Automatic Transfer Switch (ATS) configured to:
   disconnect the external power system from the plurality of fuel cell modules when the power supplied from the external power system is cut off; and
   connect the external power system to the plurality of fuel cell modules when a supply of the power from the external power system is resumed.

6. A method for controlling a line connection type fuel cell system, the method comprising:
   monitoring, by a controller, an external power system in electrical communication with a load;
   wherein the controller is in electrical communication with a control device including a plurality of fuel cell modules configured to self-generate power and an Alternating Current (AC) voltage generator and wherein the plurality of fuel cell modules and the AC voltage generator are each in electrical communication with the load;

operating, by the controller, the line connection type fuel cell system in a power system mode in which self-generated power from the plurality of fuel cell modules and power from the external power system are each supplied to the load; and when operating the line connection type fuel cell system in the power system mode and the power supplied from the external power system is cut off, the controller is further configured to:

activate the AC voltage generator to generate an AC voltage corresponding to the power supplied from the external power system; and control the plurality of fuel cell modules, to generate a current in synchronization with the AC voltage;

wherein generating the AC voltage does not generate a current corresponding to the power supplied from the external power system.

7. The method of claim 6, wherein the generating of the AC voltage comprises converting a Direct Current (DC) voltage output from an energy source into an AC voltage having a voltage and a frequency corresponding to the power supplied from the external power system.

8. The method of claim 7, wherein the energy source comprises one of a fuel cell, a battery, and an Energy Storage System (ESS).

9. The method of claim 6, wherein the monitoring of the system comprises:

monitoring a status in which power is supplied from the external power system; and monitoring a status in which the power supplied from the external power system is cut off.

10. The method of claim 6, wherein the generating of the AC voltage comprises disconnecting, by an Automatic Transfer Switch (ATS), the external power system from the plurality of fuel cell modules when the power supplied from the external power system is cut off.

11. A device for controlling a line connection type fuel cell system, the device comprising:

a plurality of fuel cell modules in electrical communication with a load; and a controller in communication with the plurality of fuel cell modules and configured to:

operate the line connection type fuel cell system in a power system mode in which self-generated power from one or more first fuel cell modules of the plurality of fuel cell modules and power from an external power system are each supplied to the load; and when operating the line connection type fuel cell system in the power system mode and the power supplied from the external power system is cut off:

control a second fuel cell module of the plurality of fuel cell modules that is not included in the one or more first fuel cell modules to generate an Alternating Current (AC) voltage corresponding to power supplied from the external power system; and control the one or more first fuel cell modules to generate a current in synchronization with the AC voltage;

wherein the second fuel cell module is controlled to not generate a current corresponding to the power supplied from the external power system.

12. The device of claim 11, wherein the controller is further configured to monitor:

a status in which power is supplied from the external power system; or a status in which the power that is supplied from the external power system is cut off.

13. The device of claim 11, further comprising an Automatic Transfer Switch (ATS) configured to:

disconnect the external power system from the plurality of fuel cell modules when the power supplied from the external power system is cut off; and connect the external power system to the plurality of fuel cell modules when a supply of the power from the external power system is resumed.

* * * * *